(12) United States Patent
Porcello et al.

(10) Patent No.: US 9,544,323 B2
(45) Date of Patent: Jan. 10, 2017

(54) SYSTEM AND METHOD FOR REMOTELY CONDUCTING A SECURITY ASSESSMENT AND ANALYSIS OF A NETWORK

(75) Inventors: David Porcello, Barre, VT (US); Oliver Wies, Middlesex, VT (US)

(73) Assignee: Rapid Focus Security, LLC, Burlington, VT (US)

( * ) Notice: Subject to any disclaimer, the term of this patent is extended or adjusted under 35 U.S.C. 154(b) by 0 days.

(21) Appl. No.: 13/542,941

(22) Filed: Jul. 6, 2012

(65) Prior Publication Data

US 2013/0014263 A1     Jan. 10, 2013

Related U.S. Application Data

(60) Provisional application No. 61/505,873, filed on Jul. 8, 2011.

(51) Int. Cl.
*G06F 21/55* (2013.01)
*H04L 29/06* (2006.01)

(52) U.S. Cl.
CPC ....... *H04L 63/1433* (2013.01); *H04L 63/0272* (2013.01); *H04L 2463/041* (2013.01)

(58) Field of Classification Search
USPC .... 726/11, 12, 14, 15, 23, 25; 713/153, 164, 713/172, 189
See application file for complete search history.

(56) References Cited

U.S. PATENT DOCUMENTS 8,452,960 B2 * 5/2013 Etchegoyen ................. 713/168
8,566,452 B1 * 10/2013 Goodwin et al. ............ 709/227
2004/0121648 A1 * 6/2004 Voros ........................... 439/535
2008/0229418 A1 * 9/2008 Chen et al. ..................... 726/23
2009/0144827 A1 * 6/2009 Peinado et al. ................ 726/25
2010/0050249 A1 * 2/2010 Newman ........................ 726/15
2012/0311694 A1 * 12/2012 Hrabik ............... H04L 63/1433
                                                                  726/15
2013/0263273 A1 * 10/2013 Ramcharran ................... 726/25

OTHER PUBLICATIONS

Andreas Gohr: "DNS Tunneling Made Easy", Splitbrain.org, Weblog, Nov. 2, 2008, (page retrieved from the Internet on Mar. 7, 2015 at: >www.splitbrain.org/blog/2008-11/02-dns_tunneling_made_simple<).*

(Continued)

*Primary Examiner* — Eleni Shiferaw
*Assistant Examiner* — Paul Callahan
(74) *Attorney, Agent, or Firm* — Kurt Rauschenbach; Rauschenbach Patent Law Group, LLC

(57) ABSTRACT

A system and method for performing a security audit of a target network. The system includes a device that establishes a connection to the target network through a communication link. The device has reverse tunneling capabilities for establishing a secure tunnel over the Internet. The system also includes a receiving computer connected to the device through the secure tunnel established by the device over the Internet, and the receiving computer sends commands to the device for performing the security audit of the target network. The device is deployed onsite near the network and the receiving computer is located at a remote offsite location. Also, the device may be covertly hidden onsite near the network to simulate a malicious attack on the target network.

29 Claims, 7 Drawing Sheets

(56) References Cited

OTHER PUBLICATIONS

Daniel Stodle: "Ping Tunnel", May 26, 2005 (page retrieved from the Internet on Mar. 7, 2015 at: >https://stuff.mit.edu/afs/sipb/user/golem/tmp/ptunnel-0.61.orig/web/<).*

Abdulla, Aman, Intrusion Detection FAQ: What is covert channel and what are some examples?, 6 pages, retrieved from: https://www.sans.org/security-resources/idfaq/covert_chan.php; retrieved on Feb. 15, 2016.

Couture, Erik, Covert Channels, Aug. 19, 2010, 39 pages, SANS Institute, retrieved from https://www.sans.org/reading-room/whitepapers/detection/covert-channels-33413, retrieved on Feb. 15, 2016.

Zander, et al., A Survey of Covert Channels and Countermeasures in Computer Network Protocols, 3rd Quarter 2007, 14 pages, vol. 9, No. 3, IEEE Communications Surveys & Tutorials.

* cited by examiner

SYSTEM AND METHOD FOR REMOTELY CONDUCTING A SECURITY ASSESSMENT AND ANALYSIS OF A NETWORK

CROSS REFERENCES TO RELATED APPLICATIONS

This application claims the benefit of U.S. application Ser. No. 61/505,873, filed Jul. 8, 2011, the entire disclosure of which is expressly incorporated herein.

COPYRIGHT NOTICE

A portion of the disclosure of this patent document contains material that is subject to copyright protection. the copyright owner has no objection to the facsimile reproduction by anyone of the patent document or the patent disclosure, as it appears in the Patent and Trademark Office patent files or records, but otherwise reserves all copyright rights whatsoever.

BACKGROUND

With a rise in network security breaches and the rise of Advanced Persistent Threats, companies are conducting tests on the vulnerability of their networks as a safety precaution. These tests may consist of security process audits, periodic vulnerability assessments and penetration tests. Security audits cover both security management processes and IT assets, which is generally called a network vulnerability assessment. Penetration testing, which is referred to as "pentesting," is a method for evaluating the security of a computer system or network by simulating an attack from a malicious source. Penetration testing can analyze a system for potential vulnerabilities and provide a report of the systems vulnerabilities to the company. Typically, vulnerabilities result from flawed system configuration, including both hardware and software flaws.

During the penetration test, the tester attempts to exploit any security vulnerability in the system or network and prepares an analysis of the network security for the company. Currently, penetration testing is performed by a third party penetration company. These pentesting engagements require the security consultant or tester to be onsite at the client's premises to gain access to the target network.

What is needed is a network security auditing system and method that allows a penetration testing company to remotely gain access to a target network securely over the Internet. Also, a network security auditing system and method is needed that allows covert access to a network, including wireless communication to better simulate a malicious attack on a network.

SUMMARY

Briefly, and in general terms, various embodiments are directed to a system for performing a security audit of a target network, and the target network includes a communication link. The system includes a device capable of establishing a connection to the target network through the communication link and the device has reverse tunneling capabilities for establishing a secure tunnel over the Internet. The secure tunnel may be encrypted via SSH. Also, the system includes a receiving computer connected to the device through the secure tunnel established by the device over the Internet. Once connected to the device, the receiving computer may send commands to the device for performing the security audit of the target network. In one embodiment, the device can be accessed by the receiving computer through a web-based user interface. In use, the device is deployed onsite within range of the target network and the receiving computer is located at a remote offsite location. In certain embodiments, the device can be covertly hidden onsite at the target network to simulate a malicious attack on the target network.

In one embodiment, security auditing or penetration testing software tools are stored in memory associated with the device. Software tools may be added or removed from the device. The device may be a form factor computer, drop box device or plug computer. It has been contemplated that other types of computers can also be used as the device, depending on size and processing requirements. The device includes additional software to create reverse tunnels for persistent remote SSH access. In another embodiment, the device is a mobile phone, and the mobile phone also includes penetration testing software tools stored in memory and additional software for creating reverse tunnels for persistent remote SSH access. The device may also be incorporated into a power strip, a microcomputer, or the like, and associated memory storing auditing software.

In one embodiment, the device of the system may connect to the Internet via an Ethernet connection to the target network. In another embodiment, the device is capable of connecting to the Internet via a wireless adapter connected to the device. Still further, the device may be capable of connecting to the Internet via a 3 G or 4 G cellular network adapter connected to the device. In this last embodiment, the device can establish out-of-band SSH access over the 3 G or 4 G network.

Another embodiment is directed to a method for performing a security audit of a target network, wherein the target network includes a communication link. The method includes connecting a device to the target network through the communication link. Also, the method includes establishing a secure tunnel over the Internet between the device and a receiving computer. The receiving computer may send commands to the device for performing the security audit of the target network. In one embodiment, a web-based user interface is used to send commands to the device from the receiving computer. Also, the device may be deployed onsite at the target network and the receiving computer may be located at a remote offsite location. In one embodiment, the method further includes covertly hiding the device onsite at target network.

The method may also include bypassing a firewall of the target network with the device when creating a secure tunnel to the receiving computer. Scan results gathered by the device during the security audit of the target network may be sent to and received by the receiving computer for further analysis.

In certain embodiments of the method, the device may be a form factor computer, drop box device or plug computer. It has been contemplated that other types of computers can also be used as the device, depending on size and processing requirements. In another embodiment, the device is a mobile phone. In yet another embodiment, the device may be a power strip including a processor or computer and associated memory storing security auditing software tools. Further, the device includes security auditing software tools stored in memory associated with the device. Additional software that allows the device to create reverse tunnels for persistent remote SSH access is also stored in memory.

The secure tunnel established by the device may be encrypted via SSH or other means known in the art. In one embodiment, the device is capable of connecting to the Internet via an Ethernet connection to the target network. The device may also access the Internet via a wireless adapter connected to the device. Still further, the device may access the Internet via a 3 G/GSM cellular network adapter connected to the device. A 4 G cellular network adapter may also be used. In this wireless embodiment, the device can establish out-of-band SSH access to the target network over the 3 G or 4 G network.

Other features and advantages will become apparent from the following detailed description, taken in conjunction with the accompanying drawings, which illustrate by way of example, the features of the various embodiments.

DETAILED DESCRIPTION

In one embodiment, a network security auditing system may be employed to conduct penetration testing of a target network and to monitor the target network for any type of malicious attack on the network. Penetration testing is a vulnerability assessment service that can detect and prevent a variety of threats to a network. These threats include the following vulnerabilities: data leakage over HTTPS, DNS, ICMP, and other trusted protocols; network access control (RADIUS/802.1x) bypass; out-of-band 3 G/GSM cellular backdoors; and covert hardware and encrypted control channels. Using the network security auditing system described below, threat assessments can be conducted remotely and securely over the Internet and by using wireless technology. The network security auditing system includes a device that connects to a target network and creates a secure tunnel between itself and a receiving computer. During penetration testing, devices can be installed in strategic locations near or within wireless range of the target network. Penetration testing can be conducted with or without the knowledge of company employees to simulate a malicious attack on the network.

Still further, the network security auditing system has a variety of uses. These uses include information security vulnerability testing and research, information security penetration testing, wireless information security auditing, mobile information security auditing, covert hardware deployments for information security testing, covert encrypted access to remote computer networks and systems over the Internet, persistent remote access to remote computer networks and systems over 3 G/GSM cellular networks, persistent remote access to remote locations, branch offices, computer networks and systems, remote information security testing without physical travel requirements, "plug and play" information security testing without client-side configuration requirements, computer information/data leakage analysis, and rogue wireless access points and mobile device attack vectors.

Figure 1:
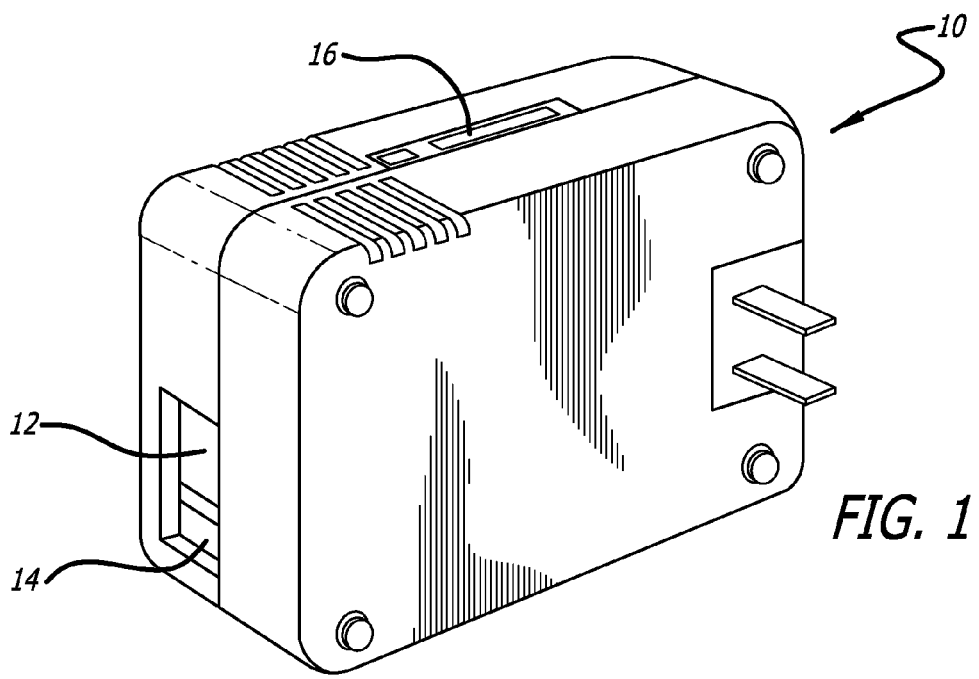
FIG. 1 depicts an example of a form factor computer or drop box device used for penetration testing a target network.

Referring now to the drawings, wherein like reference numerals denote like or corresponding parts throughout the drawings and, more particularly to FIGS. 1-8, there are shown various embodiments of a network security auditing system. More specifically, as shown in FIG. 1, the network security auditing system includes a small form factor computer or drop box device 10 that includes security auditing software stored in memory associated with the device. The device may be any type of computer that meets the size and processing capabilities required for penetration testing. By way of example only, and not by limitation, the drop box device may have the following open-source software tools pre-installed in memory associated with the device: Metasploit, Fasttrack, SET, SSLstrip, Kismet, Aircrack-NG, WEP-buster, Karma, nmap, dsniff, netcat, nikto, nbtscan, xprobe2, inguma, scapy, ettercap, and medusa. These software tools operate and perform attacks on a network to gather information for analysis as is known in the art. Any other type of penetration testing software tools may also be installed on the device. Further, the device 10 includes additional software to enable persistent remote access and web-based configuration for a user interface (UI). The device 10 allows the user or tester to easily add and remove security tools for testing and have full access to all configuration settings on each device for customization. Further, a receiving computer can log directly into the device's command terminal to issue arbitrary commands.

Also, the drop box or plug device 10 includes a central processing unit that is configured to maintain an encrypted backdoor. Different embodiments of the device include Ethernet, wireless or any type of cellular capability, including 3 G or 4 G cellular capabilities. In one embodiment, an Ethernet port 12 is disposed on the device to allow a user to connect the device to the target network through an Ethernet cable. Also, a universal serial bus (USB) port 14 is also disposed on the device. Accessories, such as a wireless USB adapter or a 3 G/4 G connectivity tool, can be connected to the USB port 14 of the device 10. Further, a SDHC/SDIO card slot 16 for disk expansion is disposed on the device. Use of an extra SD card with the device may be required for larger exploit collections, wordlists, and the like.

In one embodiment, the hardware platform for the device 10 is built on a SheevaPlug manufactured by GlobalScale Technologies. In this embodiment, the device is 4.3×2.7×1.9 inches, includes a 1.2 GHz ARM central processing unit with 512 MB SDRAM, 512 MB flash HDD, and includes 1× Gig Ethernet, 1× USB 2.0, and 1× serial console. Furthermore, the SheevaPlug by GlobalScale Technologies supports Debian, Fedora, FreeBSD, and OpenWRT ARM distributions. This device does not include a fan and can operate at 2.3 watts when idle and 7 watts max when in use. Also, this device can easily be concealed during use because of its small size for stealth operations to better simulate a malicious attack on a target network. Furthermore, the device can be decorated with decals to resemble an AC adapter, air freshener, surge protector, thermostat, power pack, or the like. The drop box device can be configured to include a silent or stealth mode that includes no listening ports or ping replies. In certain embodiments, the device can establish out-of-band security shell (SSH) access over cellular networks. As is known in the art, SSH is a network protocol that allows data to be exchanged using a secure channel between two networked devices. The encryption used by SSH provides confidential and integrity of data over an unsecured network, such as the Internet.

Furthermore, the drop box device 10 includes an aggressive "egress buster" script for remote SSH access wherever the plug has Internet connectivity, including wired, wireless, and cellular connection. By default, the device will attempt a reverse shell every minute (or any other time interval established by the user) through several covert channels. These covert channels include the following: SSH over 3 G/GSM, which ensures that no backdoor traffic touches the target network; SSH over HTTP requests with proxy support, which appears as standard HTTP traffic on the target network; SSH over SSL, which appears as HTTPS on the target network; SSH over DNS queries, which appears as DNS traffic on the target network; and SSH over ICMP, which appears as outbound pings on the target network. For additional security, the device 10 can be configured to send SMS text messages or emails to any mobile device, such as a mobile phone or tablet, or email account when a remote shell is established. These covert channels allow the user to test the effectiveness of the network's firewalls, intrusion detection systems (IDS), intrusion prevention systems (IPS), web filters, and web proxies.

Some networks are protected by network protocols including 802.1X and the network may be running a Remote Authentication Dial In User Service (RADIUS) and Extensible Authentication Protocol (EAP) to authenticate a client device attempting to connect to a local area network (LAN) or wireless local area network (WLAN) of the network. In one embodiment, the device 10 supports a network access control (NAC) bypass for 802.1X/RADIUS implementations. The device accomplishes this by acting as a network layer 2 transparent bridge. In this mode, the NAC/802.1x authentication process between a client computer/system and a network switch occurs transparently through the device, after which the device establishes a reverse SSH tunnel using the MAC address and IP address of the client computer/system.

The disclosed embodiments of the network security auditing system have several benefits to its users. With the device 10 connected to the target network and providing a secure tunnel for the tester to access the device remotely, the security consultant or tester can avoid traveling to the location of the target network. In actual use, the third party tester can send a drop box device 10 to the location of the target network, where the device can be connected to the target network. Also, no configuration or firewall changes need to be made to the target network, because the device is preconfigured by the tester to persistently tunnel out of the target network using one or more covert, encrypted channels. The device 10 is also simpler and more compact than netbooks and microATX appliances currently used in penetration testing.

The device 10 can be built on other types of plug computers, such as the Nimbus Plug Computer. The Nimbus Plug Computer is 3.27×2.05×1.70 inches, includes a USB 2.0 port, a gigabit Ethernet, 1.2 GHz processor, 512 MB DDR2 and 512 MB NAND Flash. The same software tools are preloaded on this device as described above, and additional software is also preloaded on the device to enable the central processing unit to create a persistent remote access and web-based configuration as described above.

Figure 2:
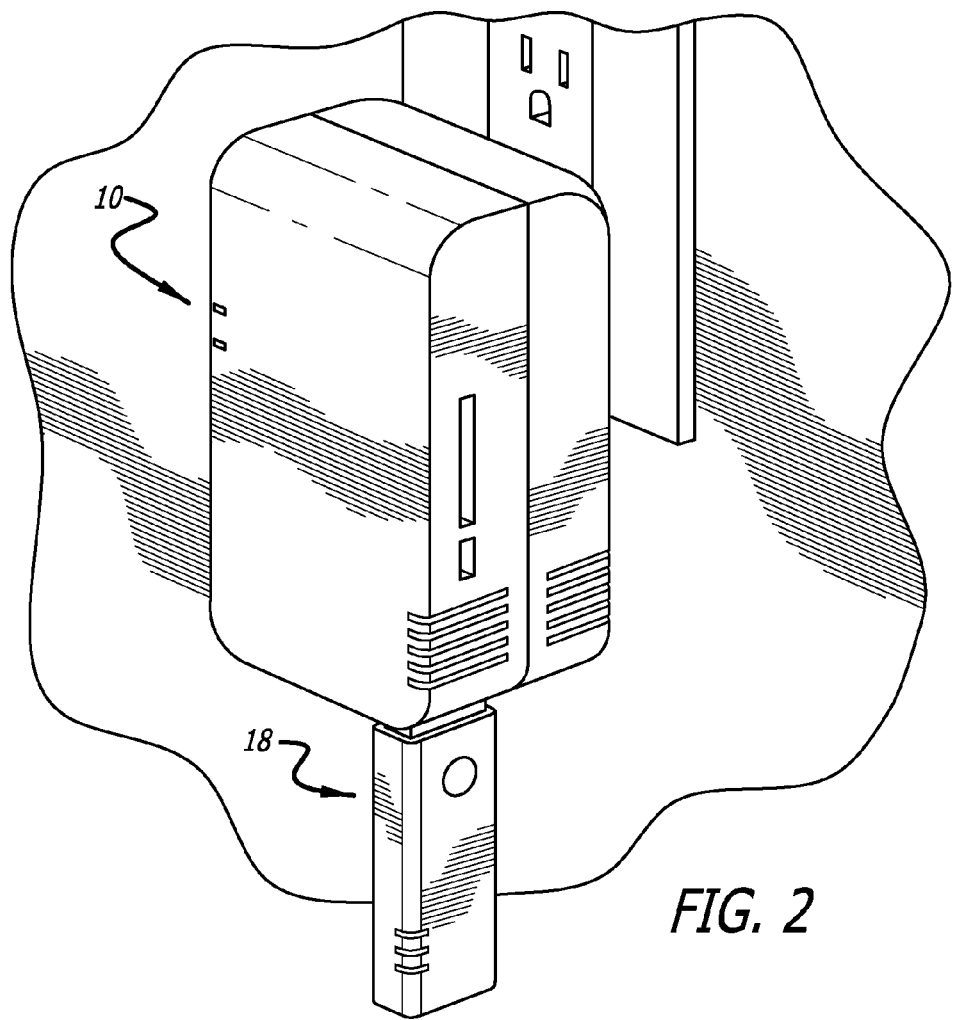
FIG. 2 depicts an example of a drop box device having a 3 G adapter attached to a USB port of the device, and the device is shown to include a decal resembling an air freshener plug-in for covertly hiding the device onsite at a target network.

In another embodiment, and as shown in FIG. 2, the device 10 includes wireless security tools and a wireless network interface controller 18 to connect to a wireless local area network (WLAN). An example of a wireless network interface controller 18 is an external 1000 mW ALFA AWUS036H wireless USB adapter. The wireless network interface controller 18 can plug directly into the USB port 14 on the device 10. By way of example only, and not by way of limitation, this wireless device may have the following open-source software tools pre-installed in memory associated with the device: Ubuntu, Kismet, Aircrack-NG, WEPbuster, Karma, Metasploit, SET, Fasttrack, SSLstrip, nmap, dsniff, netcat, scapy, ettercap, medusa, and any other pentesting software tools. The wireless embodiment of the device provides wireless encryption cracking and Evil AP mode. Furthermore, the wireless embodiment of the device supports packet injection, monitor mode, and managed mode. Use of WEPbuster allows the device to auto-crack all WEP networks in range.

In "Evil AP mode," the device acts as a wireless Access Point (AP) that responds to wireless computers as they probe the airwaves for preferred, trusted, or open wireless networks. Once the client computer associates to the Evil AP, the network traffic between the client and the Internet or target network can be manipulated in a number of ways. For instance, HTTP, DNS, and other types of network traffic can be recorded or redirected, HTTPS encryption can be decrypted or nullified, client web browser cookies and information can be extracted, and client operating systems can be compromised or controlled. In "monitor mode," the wireless device can passively record wireless network traffic in an undetectable manner by restricting the devices transceiver to receive functionality only. In "managed mode," the wireless device can be used to associate with other wireless access points, through which the standard security and pentesting tools can be used.

Still in another embodiment, the device 10 may be capable of gaining out-of-band SSH access over cellular networks. In this embodiment, a 3 G or 4 G USB modem or adapter is attached to the USB port 14 of the device. Examples of a 3 G USB modem include a Huawei e160 GSM adapter, Huawei e176 adapter, Verizon USB760 3 G adapter, and Virgin Mobile MC760 3G adapter. Examples of a 4 G USB modem include a Huawei E369 adapter and a T-Mobile Rocket 4 G adapter. By way of example only, in this cellular network embodiment of the device, the following open-source software tools may be pre-installed in memory associated with the device: Ubuntu, Metasploit, SET, Fasttrack, SSLstrip, nmap, dsniff, netcat, nikto, nbtscan, scapy, ettercap, JTR, medusa, and any other pentesting software tools. The cellular network embodiment of the device is able to bypass the application-aware firewalls and/or intrusion prevention system (IPS) by creating out-of-band SSH access over a cellular network. Furthermore, the cellular network embodiment of the device can maintain a connection to the Internet if the device loses a wired connection to the internet. The device can also be used to send and receive SMS text messages from the command line.

Figure 3:
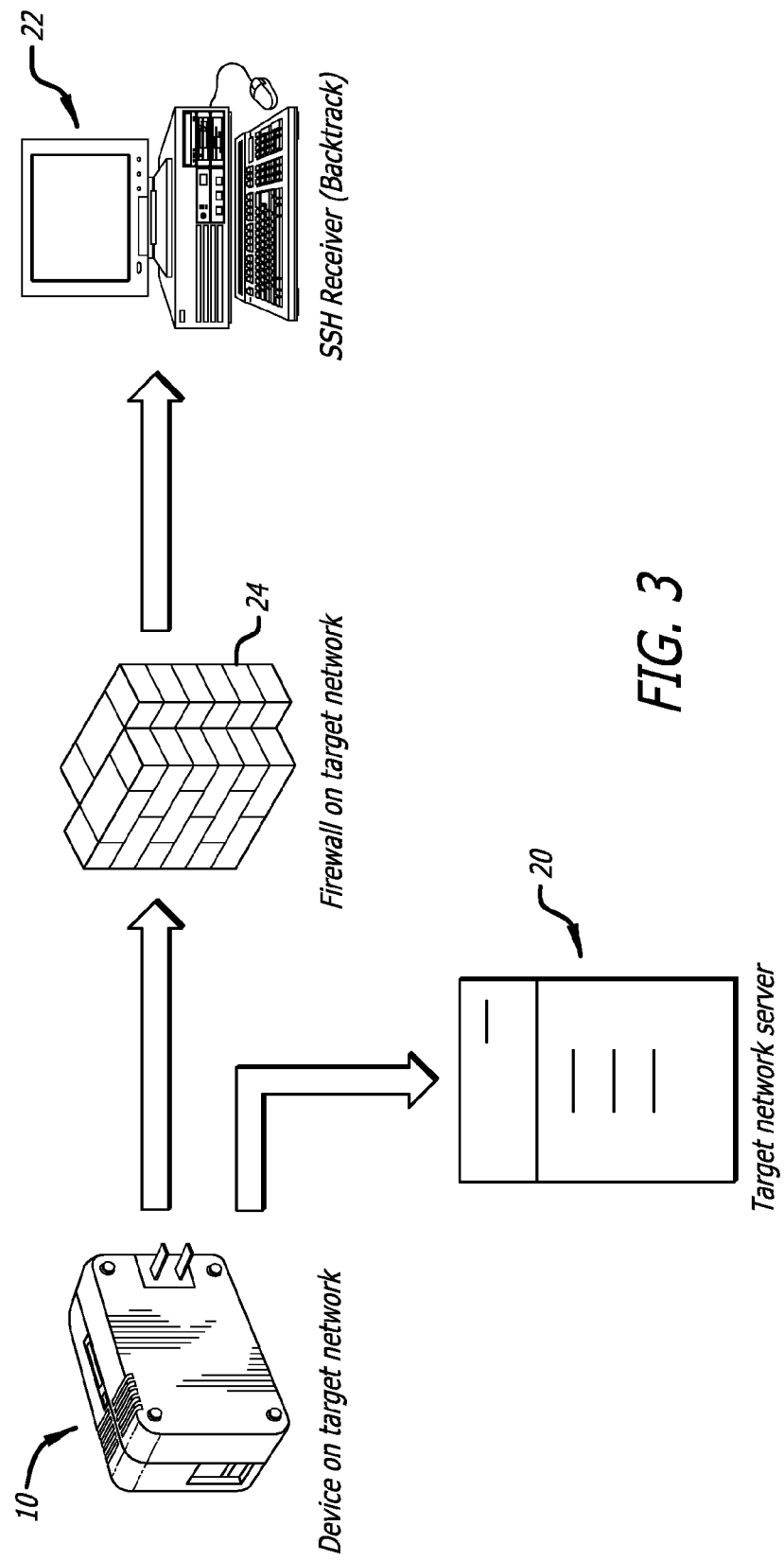
FIG. 3 depicts a diagram of a device connected to a target network and the device is also connected to an SSH receiver (Backtrack) through a secure tunnel that bypasses a firewall of the target network.

A diagram of the device 10 connected to a target network 20 and an SSH receiver 22 through a firewall 24 and IPS, if necessary, is shown in FIG. 3. As discussed above, the device 10 includes aggressive reverse tunneling capabilities for persistent remote SSH access. All tunnels are encrypted via SSH and will maintain access wherever the device has an Internet connection. The device is capable of traversing strict egress firewall filters, webfilters, and HTTP proxies. By way of example only, and not by limitation, the following covert tunnelling options are available for traversing strict firewall rules and application-aware IPS: SSH over any TCP port; SSH over HTTP requests (appears as standard HTTP traffic); SSH over SSL (appears as HTTPS); SSH over DNS queries (appears as DNS traffic); and SSH over ICMP (appears as outbound pings). In one embodiment as shown in FIG. 3, the device 10 is a standalone device and the user or tester logs directly into the device from the receiver 22. In another embodiment described below, several devices may be controlled by a central device management console.

Figure 4:
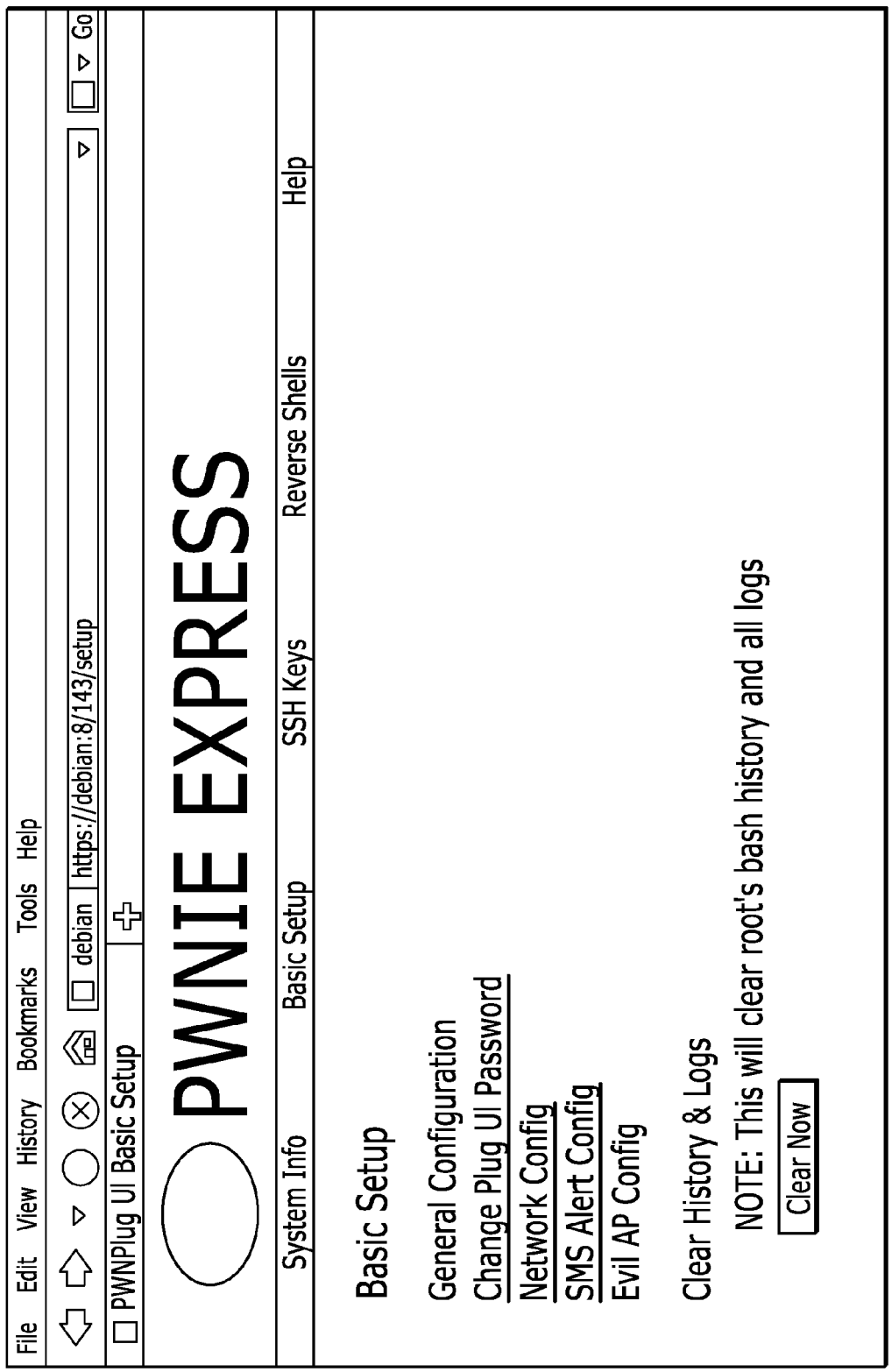
FIG. 4 depicts a screen shot of a web-based user interface for accessing a remote device used to conduct penetration testing of a network.

In the standalone embodiment, the user or tester can control the device 10 and analyze data collected through a web-based user interface (UI). A sample screen shot of a web-based UI is depicted in FIG. 4. In one embodiment, the user or tester can log directly into the Linux command terminal of the device 10 to issue new commands to the device and run the necessary security software protocols. Information from these security software protocols is gathered by the device and sent to the SSH receiver 22 for review and analysis. From this analysis, a report can then be generated detailing the vulnerability of the network. The information gathered includes a wide range of network and computer system details, network traffic captures, network scan reports, and penetration testing tool output. The information can be stored on the drop box device or sent to the remote user through the encrypted tunnel.

A method for using the drop box device 10 to conduct a security audit of a target network will now be described. Initially, the device 10 will need to be connected to a power source and to the target network through a LAN or WLAN. The device will acquire an IP address from a DHCP server and the IP address of the device can be determined by checking the DHCP server logs or nmap sweep. A secure tunnel will be created automatically by the device and the tunnel may be encrypted via SSH. A password may need to be entered to gain control of the device. The pre-installed software tools are stored in memory associated with the device, and the software tools may be launched by the user through the UI.

To access the serial console, a USB cable is connected between the USB serial port 14 of the device 10 and a computer, preferably a computer with a Linux operating system. The serial console can then be accessed through the web-based UI.

A setup page 30 of the UI is shown in FIG. 4A. The setup page of the UI can be accessed by opening a browser and entering: https://[device_ip_address]:8443. The device is SSL-enabled, but the user may receive a warning because the certificate is self-signed. The user will be prompted for a login/password, which will be provided to the user. The web-based UI can be disabled and re-enabled at any time.

As shown in FIG. 4, a top menu of the UI allows navigation to various pages, including system information, basic setup, SSH Keys, reverse shells and a help menu. The system information page may show the status of the reverse shells, network/system info, etc. FIG. 4 illustrates the basic setup page, which includes links to the general configuration, change device UI password, network configuration, SMS alert configuration, AP configuration, and reverse shells.

A reverse shells page can be navigated to using the web-based UI to activate reverse shells. By way of example only, reverse shells may be activated by using checkboxes located next to a plurality of reverse shells listed on the reverse shells page. However, any method may be used to activate reverse shells. The SSH receiver IP address or DNS name for each reverse shell will need to be entered and the device will connect to this system when establishing the reverse shell connections. The interval for attempting to connect to each reverse shell can be established by the user or the device will automatically attempt to connect to each reverse shell at predefined intervals.

The SSH receiver (Backtrack) 22 can also be configured from the web-based UI. It is preferred that the SSH receiver is a Backtrack 4 R2 system to receive the reverse SSH connections. It has also been contemplated that other *nix distributions may also be used. The Backtrack system 22 will serve as the reverse SSH receiver and the device 10 will connect to this system when establishing the reverse shell connections. This system is accessible from the Internet using a public IP address or DNS name.

In one embodiment, before starting SSHD on the Backtrack system, SSHD setup program may be run first. The SSH server may be open and this SSH server will be accessible from the Internet, so the default Backtrack root user password should be changed before proceeding. A new account for the device may be created and the device will use this to login to the Backtrack system.

In this embodiment, to configure the SSH receiver, the user may need to log into the web-based UI and navigate to the "SSH Keys" page. A new SSH key may need to be generated from the UI. Certain steps may need to be followed to listen for the desired reverse shells, including reverse SSH, reverse SSH over HTTP tunnel, reverse SSH over SSL tunnel, reverse SSH over DNS tunnel, reverse SSH over ICMP tunnel, and reverse SSH over cellular networks.

Through the basic setup page 30 of the UI, the system may be configured to send a text message or email to a mobile device number or email account when a reverse shell connects in order to alert the tester. A cellular number or email address may be used for receiving the text message or email from the system.

Once a secure tunnel is established between the drop box device 10 and the receiver computer, the simulated attack on the target network can begin. In one embodiment, the approach involves performing network system reconnaissance, scanning for entry points and vulnerabilities, running pentesting tools to exploit vulnerabilities, and gathering, storing, analysing, and documenting the findings in a detailed report.

In one embodiment where the device is 3 G/4 G/GSM capable, an unlocked GSM adapter supports five GSM cell bands (HSDPA/GSM/UMTS/EDGE/GPRS) and is compatible with AT&T, T-mobile, Vodafone, Orange, and GSM carriers. To use the GSM adapter, a SIM card from a compatible GSM cell provider may be inserted into the adapter. The mobile service attached to the SIM card must have mobile broadband data service to gain access to the Internet. With the SIM card installed, the adapter is connected to the USB port 14 of the device to load the GSM driver. The device can then be accessed through the secure tunnel to call the GSM dialup script. As long as a 3 G or 2 G cell signal is available, the adapter will establish an Internet connection. It has also been contemplated that the adapter can establish an Internet connection on an available 4 G cell signal. An indication may be provided on the adapter, such as illuminating an LED light, once the adapter is connected to the Internet. After establishing a connection to the Internet the default route may need to be reset to use the 3 G interface (ppp0).

Figure 5:
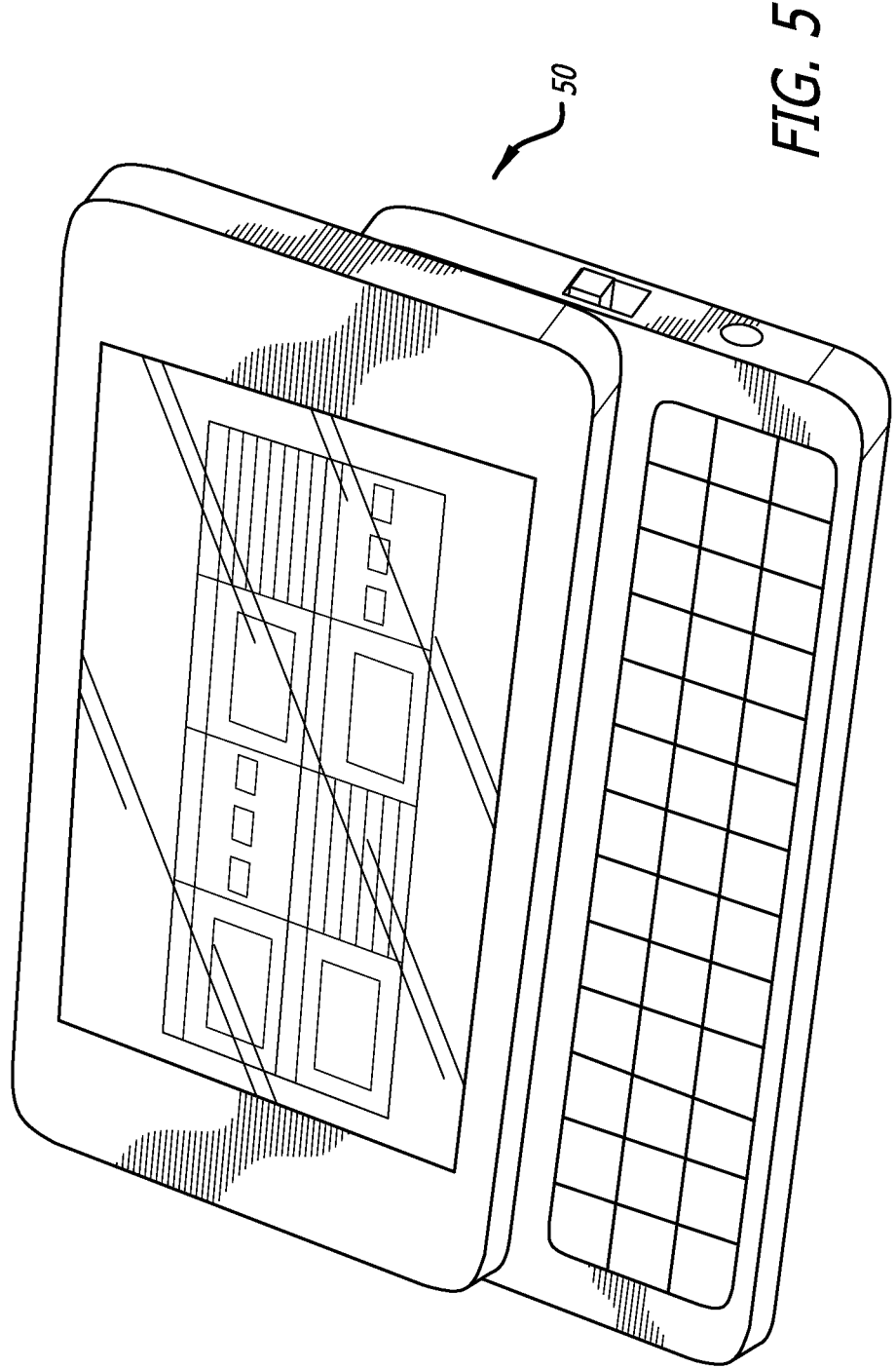
FIG. 5 depicts an example of mobile phone used as a drop box for penetration testing a target network.

In another embodiment, the network security auditing system may be incorporated with a mobile phone device 50 as depicted in FIG. 5. The mobile phone device 50 may be a Nokia 900 which includes a Linux operating system and the built-in wireless card supports packet injection for WEP cracking, monitor mode, and promiscuous mode for passively detecting other network traffic. Other mobile phones and devices can also be used as the hardware platform for the mobile phone device, including wifi/802.11x-enabled mobile phones and devices, such as iPhones, iPads, and Android mobile phones. The mobile phone device 50 also can include man in the middle capabilities for intercepting network traffic. As with the plug device 10, the mobile phone device 50 also is capable of maintaining an encrypted backdoor and the mobile phone includes wireless and cellular connections.

The mobile phone device 50 may include a wide variety of security auditing software tools installed with quick access shortcuts. The security auditing software can be stored in memory associated with the mobile phone device. As an example, the device may have the following open-source software tools pre-installed in memory associated with the device: Metasploit, Fasttrack, SET, Scapy, Nikto, SSLstrip, iodine, Kismet, Aircrack-NG, Wifite, Wifizoo, GrimWEPa, Wepbuster, Nmap, netcat, tcpdump, wireshark, tshark, Ettercap-NG, exploitDB, macchanger, presencevnc client, x11vnc server, conky, tor, rdesktop, openvpn, netmon, iptables, and any other pentesting software tool.

In one embodiment the mobile phone device 50 can be used in a similar manner as the device 10 discussed above with reference to FIG. 3. For stealth monitoring and assessment of a target network, the mobile phone device can be hidden onsite at the location of the target network. The mobile phone device can operate from battery power, which makes hiding the device onsite easier. However, the mobile phone device can also be plugged into an electrical outlet or other power source for power. Similar to device 10, the mobile phone device 50 includes additional software to enable persistent remote access to the mobile phone device from a receiver computer. Further, a security consultant or tester can access the mobile phone device through the web-based UI as described above with regard to the plug device 10. The mobile phone device 50 allows the user or tester to easily add and remove security tools for testing and have full access to all configuration settings on the device for customization. Further, users may log directly into the mobile device's command terminal to issue arbitrary commands.

As with the plug device 10, the mobile phone device 50 can also be configured to include a silent or stealth mode that includes no listening ports or ping replies. With its cellular connectability, the device 50 can establish out-of-band security shell (SSH) access over cellular networks. Furthermore, mobile phone device 50 includes an aggressive "egress buster" script for remote SSH access wherever the phone has Internet connectivity, including wireless and 3 G/4 G/GSM. By default, the device will attempt a reverse shell every minute (or any other time interval established by the user) through several covert channels: SSH over 3 G/4 G/GSM, which ensures that no backdoor traffic touches the target network; SSH over HTTP requests with proxy support, which appears as standard HTTP traffic on the target network; SSH over SSL, which appears as HTTPS on the target network; SSH over DNS queries, which appears as DNS traffic on the target network; and SSH over ICMP, which appears as outbound pings on the target network. For additional security, the device 50 can be configured to send an SMS text message or email to any a separate mobile phone number or email account when a remote shell is established.

In another embodiment, the mobile phone device 50 can be used to access the target network for monitoring and security analysis with a user or tester directly operating security protocols from a user interface of the mobile phone device while the tester is onsite and within range of the target network. The tester can operate the security protocols directly from the UI of mobile phone. Also, as an added benefit, the tester can inconspicuously conduct pentesting assignments because the tester will appear to be using an ordinary mobile phone for purposes of texting, browsing, or running applications. In this embodiment, no secure tunnel is needed when the tester is accessing the UI directly on the mobile phone for pentesting.

Figure 6:
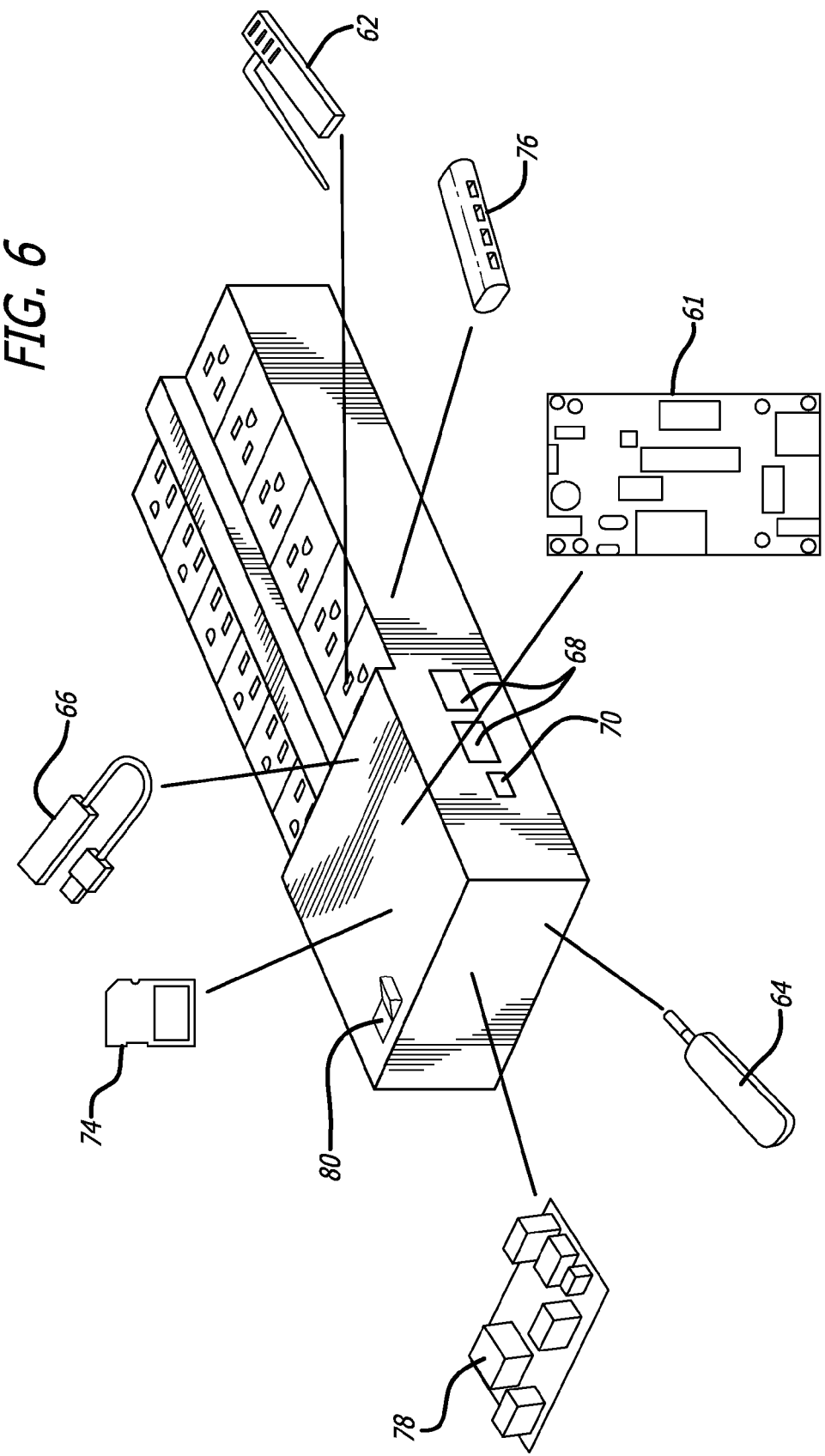
FIG. 6 depicts a pictorial representation of a component placement of a power strip device used as a drop box for penetration testing a target network.
Figure 7:
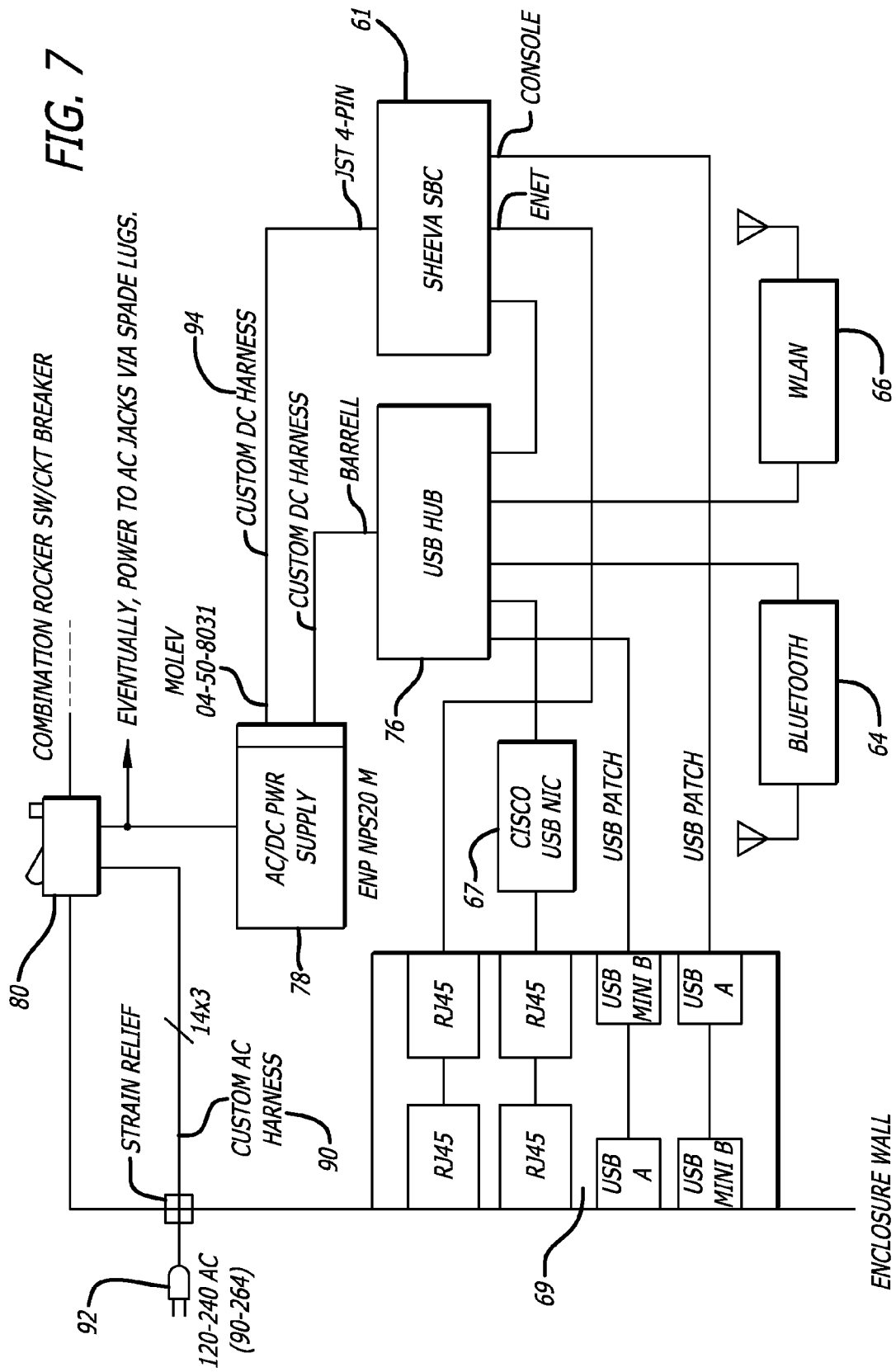
FIG. 7 depicts a schematic diagram of the power strip drop box shown in FIG. 6.

In yet another embodiment, the device of the network security auditing system is incorporated into a power strip 60 as shown in FIGS. 6 and 7. The power strip may be functioning, or the outlets on the power strip may not function, and only the housing of power strip is used to disguise the drop box device. The power strip embodiment of the device operates similar to device 10 as discussed above. The power strip device 60 includes a micro-computer 61 mounted inside a power strip enclosure, with the addition of an internal 802.11b/g/n wireless transceiver 62, internal Bluetooth adapter 64, USB Ethernet adapter 66, on-board dual-Ethernet 68 for Network Access Control (NAC) bypass, a passive USB/Ethernet PCB 69, and an on-board USB port 70. The computer 61 of the device 60 may be a SheevaPlug single-board computer, or any other type of computer. The computer 61 may include a slot for an SDHC card 74 as shown in FIG. 6. A USB hub 76 is connected to the single-board computer 61 to connect various other devices. By way of example, the USB hub may be a Belkin F4U040v four-port USB hub. There is also a power supply unit 78 that is connected to the power switch 80 of the power strip.

By way of example only, and not by limitation, FIG. 7 is a schematic diagram showing the internal connection of one embodiment of the power strip device 60. As shown, an AC wiring harness 90 includes an external AC three-prong power cord 92, the power switch 80, and a two-wire AC lead that connects to the input of the power supply unit 78. In one embodiment, an optional split AC circuit provides fully functioning, usable power outlets on the outside of the power strip device 60.

The DC output of the power supply unit 78 is connected to the single-board computer 61 and the 4-port USB hub 76 using the DC wiring harness 94. The USB hub 76 is connected to the Bluetooth adapter 64, the wireless adapter 66, the Ethernet adapter 67, and an internal mini-USB jack on the passive USB/Ethernet PCB 69.

Furthermore, a mini-USB jack on the USB hub 76 is connected to a full-size USB jack on the single board computer 61. An Ethernet jack on the single-board computer 61 is connected to an internal Ethernet jack on the passive USB/Ethernet PCB 69 using a standard cat6 Ethernet patch cable. As shown in FIG. 7, the Ethernet adapter 67 is connected to an internal Ethernet jack on the passive USB/Ethernet PCB 69 using a standard cat6 Ethernet patch cable.

A mini-USB jack on the single-board computer 61 is connected to the internal full-size USB jack on the passive USB/Ethernet PCB 69 using a standard USB cable.

In one embodiment, the power strip device 60 consists of a Debian-based, streamlined, security-hardened base root file system running from a SD card, such as a 32 GB Class-10 SD card that is connected to the single-board computer 61. Also, in one embodiment, the power strip device 60 software tools include a pentesting toolset, persistent remote access functionality, and the Plug UI software.

In one embodiment the baseline power strip device 60 reverse-SSH covert channel options include SSH over any TCP port, SSH over HTTP requests (appears as HTTP traffic), SSH over SSL (appears as HTTPS), SSH over DNS queries (appears as DNS traffic), SSH over ICMP (appears as outbound pings), and SSH access over 3 G/GSM cellular networks. Additional covert channel options may include OpenVPN, iodine, ftp tunnelling, SSH "egress buster", HTTP proxy support, and SSH TUN interface support for VPN-like SSH tunnelling.

In other embodiments, the power strip device 60 includes additional Plug UI features, such as passive/automated recon and point-and-click SSH receiver setup. The power strip device 60 may also include "Stealth mode" support (no listening ports or ping/ARP replies). Also, the power strip device 60 may include fully-automated NAC/802.1x/RADIUS bypass, and the ability to text in bash commands via SMS text messages from approved mobile phones (controlled by source phone number).

In use, the power strip device 60 will maintain persistent, secure remote access to the target network through a variety of covert TCP/IP channels. In one embodiment, an 3 G/GSM adapter is connected to the USB port 70 of the USB/Ethernet PCB 69, which allows for secure remote access to the target network through a 3 G/GSM cellular network. It has been contemplated that an internal 3 G/GSM adapter could be connected to the USB/Ethernet PCB 69 within the enclosure of the power strip. Also, a 4 G adapter could be used to access the target network through a 4 G cellular network. Using the pre-installed security software suite, which may include any of the software discussed above with regard to either device 10 or device 50, a security practitioner can then conduct a full-scale penetration test over the Internet from any remote location.

This hardware/software solution is expected to both simplify and increase the effectiveness of penetration testing across the distributed enterprise. The plug-and-play design of the power strip device 60 will allow a security professional to quickly test many critical layers of an organization's security program, including physical security, employee awareness, perimeter/egress filtering, ability to detect covert data exfiltration channels, Network Access Controls (NAC), network device security (servers, desktops, printers, etc.), and radio frequency (RF) emission control.

Figure 8:
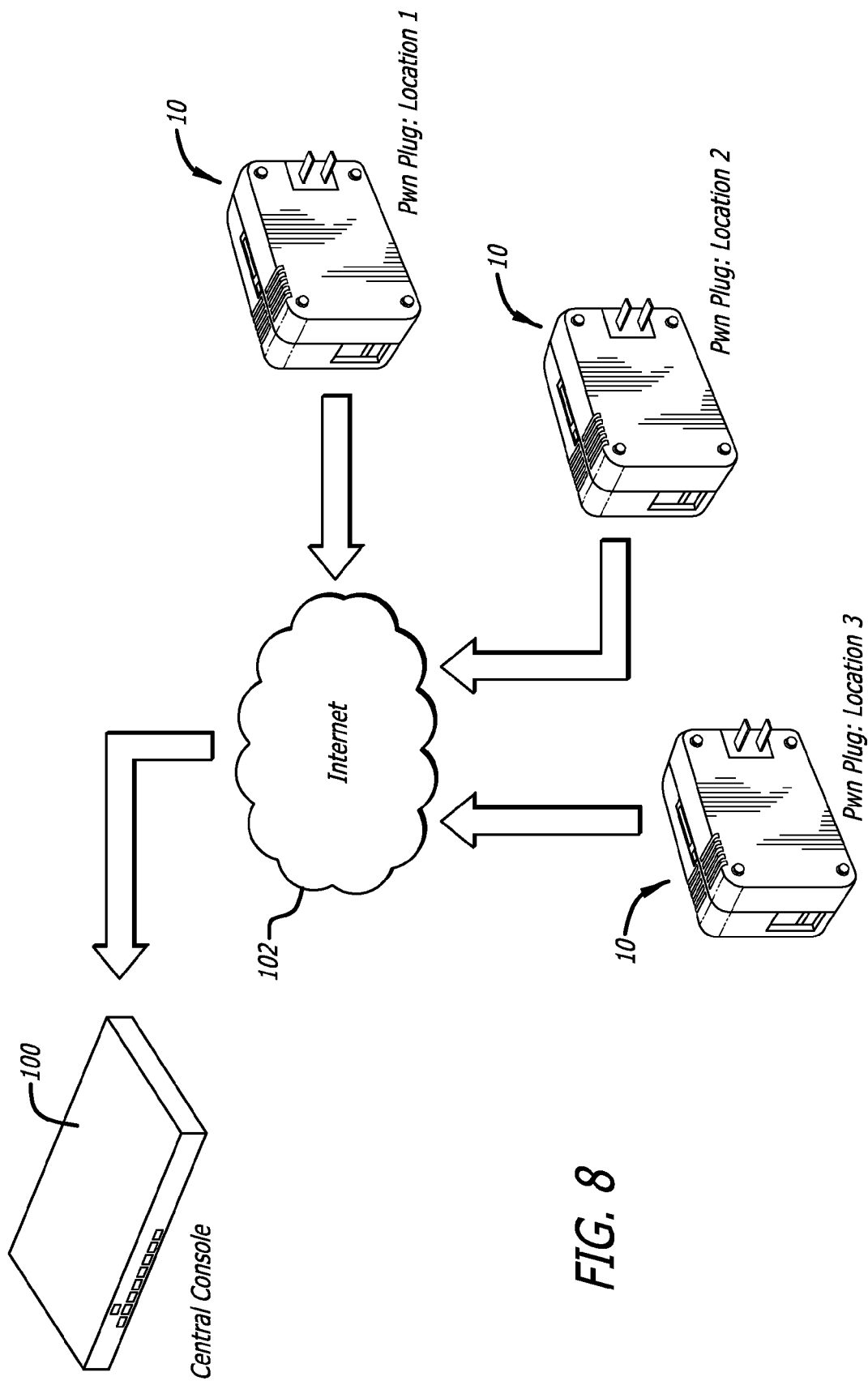
FIG. 8 depicts a diagram of a distributed pentesting platform embodiment, where a central console manages multiple drop boxes via the Internet and the devices are deployed at various sites.

Referring now to FIG. 8, a plurality of devices 10, 50, and/or 60 may be deployed and connected to target networks at separate locations and are managed by a central management console 100 with a distributed pentesting platform. As shown in FIG. 8, the devices 10 are connected to the central console 100 via the Internet 102. It should be understood that a plurality of devices, 10, 50, or 60 can be used in combination with one another, and each connected to the central console 100 via the Internet. In another embodiment, the device may also be connected over an intranet. The distributed pentesting platform is an appliance/cloud-based, web-enabled, database-driven administration console for the central management of devices deployed at multiple locations. For example, multiple devices 10 may be located across hundreds to thousands of branch offices and retail locations of a company. As exemplified by many high-profile retail chain breaches and the rise of Advanced Persistent Threats (APT), banks, retailers, and other distributed enterprises know that a single branch office is often used as a stepping stone for larger enterprise-wide attacks. Keeping ahead of this threat requires an aggressive, continuous, and enterprise-wide solution. Unlike traditional penetration testing, the current distributed pentesting platform will provide a cost-effective and scalable mitigation for this game-changing threat.

In one embodiment, the distributed pentesting platform may include customer-premises rackable or small form-factor network appliance. Also, appliance operating system may be 64-bit RedHat/CentOS or similar server-class Linux derivative. A back-end database server may be MySQL or comparable, and a back-end application server platform may be JBOSS or comparable. A front-end web server may be Apache or comparable and a front-end user interface may be Ruby/JRuby/PHP/Ajax or comparable.

A user interface (UI) can be web-based and include a network configuration page to set applicant IP, DNS/NTP servers, etc. The UI may also have SSL support with the ability to upload customer certificate. It has been contemplated that the UI in this embodiment can have multiple user accounts with basic role support (full-admin or read-only admin). The UI can have the ability to export and import appliance configuration files for backup and restore. Also, the UI may have the ability to upgrade appliance via downloadable upgrade packages and the ability to initiate support requests from appliance. It may be possible to view appliance syslogs and forward them to a central syslog server from the UI.

Features of the drop box devices can be managed through the UI of the distributed pentesting platform. For instance, the UI can allow an administrator to view, group, sort, and manage currently deployed drop box devices 10, 50, or 60 in the field. Information regarding each deployed device can be viewed through the UI including the device's status, health/load, location, software level, IP, etc. The UI will also enable remote updating of the drop box device software levels. Furthermore, SSH keys can be pushed or revoked through the UI of the management console. Also, basic drop box device settings can be remotely configured via the web-based UI for the drop box device described above.

The UI associated with the console 100 for the distributed pentesting platform will control tasks performed by the drop box devices. In one embodiment, the console will remotely issue basic canned pentesting tasks to individual devices and groups of devices. These are tasks aimed at the junior security administrator, such as nmap scans, vuln scans, password scans, and fasttrack. Further, the console can remotely issue custom commands. Support for uploading and downloading files to individual devices and groups of devices may also be enabled on the distributed pentesting platform. For advanced pentesting tasks and configurations, the console may provide access to a web-based bash-like terminal interface. It has also been contemplated that the platform may proxy the SSH connections to target drop box devices through the appliance.

In one embodiment, the distributed pentesting platform may have reporting capabilities, including the ability to capture canned task output in a clean, formatted, exportable report format. Also, the platform may support PDF, HTML, CSV, and plain-text export formats for canned task reporting. Furthermore, the platform may also support plain-text format for custom task reporting.

A network and system management (NSM) device will now be described. The NSM device is a plug-and-go micro appliance designed for network security monitoring, intrusion detection, and data leakage monitoring for small-medium business and home networks.

Similar to the drop box device 10, the hardware platform for the NSM device may be built on a SheevaPlug manufactured by GlobalScale Technologies. However, the NSM device can be built on other types of computers, including the Nimbus Plug Computer. Installation and setup of the NSM device is simplified by using a relatively small form factor computer, plug computer or drop box. A Cisco-Linksys USB300M adapter is also connected into the USB port on the NSM device. The NSM device includes security auditing software stored in memory associated with the device. As an example, the NSM device may have the following open-source software tools pre-installed in memory associated with the device: Ubuntu, Argus, Bro-IDS, Snort, Ntop, ngrep, p0f, tshark, tcpflow, ssldump, trafshow, and any other desired software. These software tools monitor activity on target networks and gather information for analysis as is known in the art. Further, the NSM device includes additional software to enable persistent remote access and web-based configuration for a user interface (UI). The NSM device allows the user or tester to easily add and remove network monitoring tools and have full access to all configuration settings on each NSM device for customization. Further, users may log directly into a device's command terminal to issue arbitrary commands.

In one embodiment, the NSM device includes a custom network anomaly detection dashboard. Also, the NSM device includes an Ethernet-over-USB interface for out-of-band management access. In one embodiment, the default configuration of the NSM device is ideal for monitoring perimeter Internet links or small DMZs, branch offices, and home networks.

In use, an SD card is inserted into the NSM device's plug card slot. The SD card will be the network log storage point. The onboard ethernet interface is connected to a switch monitor port, tap, or hub to serve as the passive monitoring interface. Also, the USB-to-Ethernet adapter should be connected to an interface to a private LAN. This will serve as the NSM device management interface (HTTP/SSH access).

After powering the NSM device on, the SSH client should be pointed to the NSM device's default IP address. Login and password will need to be entered to begin monitoring. The stats on the dashboard of the NSM device are updated hourly or any other time period set by the user. In one embodiment, Snort, Ntop, Argus, and Bro-IDS logs are written to the SD card inserted in the NSM device.

The NSM device monitors network usage by tracking the bandwidth utilization by interface, byte totals for network, byte totals for specific host, byte totals for a host-pair, per-protocol packet/byte totals, and top 10 host-pairs based on bytes. The NSM device also searches for anomalies by passive OS identification, top HTTP flows based on bytes, top 10 HTTP hosts based on number of connections, suspicious traffic to a web server, and top client IPs for a server. Further, the NSM device monitors printable HTTP strings, list HTTP GETs & POSTs (byline mode), list email addresses, IP addresses in packet payloads, HTTP downloads of executable files, Bro-IDS archive for specific e-mail address in SMTP traffic, and SMB protocol errors.

In one embodiment the NSM device decrypts SSL streams with a given private key. For successful decryption, the initial full SSL handshake must be present in the capture. A full SSL handshake contains ClientHello, ServerHello, Certificate, ServerHelloDone. Display of only the ClientHello, ServerHello, and ChangeCipherspec, indicates that this is a continuation of a previously established SSL session and cannot be decrypted without the initial full handshake. It should be noted that SSL sessions using the Diffie Hellman key exchange (DHE) cannot be decrypted by tShark.

One of ordinary skill in the art will appreciate that not all systems for performing a security audit of a network have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A system for performing a security audit and remote penetration testing of a target network, the target network including a communication link, the system comprising:
   a) a device deployed onsite behind a firewall at the target network configured to maintain an encrypted backdoor and configured to be capable of establishing a connection to the target network through the communication link, the device being preconfigured by a tester to initiate reverse tunneling and to establish a persistent secure tunnel bypassing the firewall over the Internet using a covert channel initiated by the device; and
   b) a receiving computer located at a remote offsite location outside the firewall connected to the device through the persistent secure tunnel bypassing the firewall established by the device over the Internet;
   wherein the device is deployed onsite at the target network and the receiving computer is located at the remote offsite location outside the firewall,
   wherein the device is configured to include a stealth mode that comprises no listening ports or ping replies and wherein the device acts as a network layer-two transparent bridge such that the device supports 802.1X network access control protocol bypass, and wherein the device comprises software that simulates an attack on the target network.

2. The system of claim 1, wherein security auditing software tools are stored in memory associated with the device.

3. The system of claim 1, wherein the device is a form factor computer, drop box device or plug computer.

4. The system of claim 1, wherein the device is a mobile phone comprising penetration testing software tools.

5. The system of claim 1, wherein the device is incorporated into a power strip.

6. The system of claim 1, wherein the persistent secure tunnel established by the device is encrypted via SSH.

7. The system of claim 1, wherein the device connects to the Internet via an Ethernet connection to the target network.

8. The system of claim 1, wherein the device connects to the Internet via a wireless adapter connected to the device.

9. The system of claim 1, wherein the device connects to the Internet via a 3 G cellular network adapter connected to the device.

10. The system of claim 9, wherein the device is capable of establishing out-of-band SSH access over the 3 G network.

11. The system of claim 1, wherein the device is covertly hidden onsite at the target network.

12. The system of claim 1, wherein the device is accessed by the receiving computer through a web-based user interface.

13. The method of claim 1, wherein the covert channel comprises SSH over 3 G/GSM.

14. The method of claim 1, wherein the covert channel ensures no backdoor traffic touches the target network.

15. The method of claim 1, wherein the covert channel comprises SSH over HTTP requests with proxy support.

16. The method of claim 1, wherein the covert channel appears as standard HTTP traffic on the target network.

17. The method of claim 1, wherein the covert channel comprises SSH over SSL.

18. The method of claim 1, wherein the covert channel appears as HTTPS on the target network.

19. The method of claim 1, wherein the covert channel comprises SSH over DNS queries.

20. The method of claim 1, wherein the covert channel appears as DNS traffic on the target network.

21. The method of claim 1, wherein the covert channel comprises SSH over ICMP.

22. The method of claim 1, wherein the covert channel appears as outbound pings on the target network.

23. A method for performing a security audit and remote penetration testing of a target network, the target network including a communication link, the method comprising:
  a) configuring a device deployed onsite at the target network behind a firewall to maintain an encrypted backdoor and to allow the device to initiate reverse tunneling and establish a persistent secure tunnel that bypasses the firewall;
  b) connecting the device to the target network through the communication link;
  c) initiating the persistent secure tunnel that bypasses the firewall over the Internet from the device to a receiving computer located at a remote offsite location outside the firewall, using a covert channel initiated by the device;
  d) performing the security audit of the target network using software stored in memory associated with the device; and
  e) performing network layer-two transparent bridging using the device such that the device supports 802.1X network access control protocol bypass, and wherein the device is configured to include a stealth mode that comprises no listening ports or ping replies, and
  wherein the performing remote penetration testing uses software that simulates an attack on the target network.

24. The method of claim 23, further comprising receiving scan results from the device performing the security audit of the target network at the receiving computer.

25. The method of claim 23, wherein the device is a form factor computer, drop box device or plug computer, and the device includes security auditing software tools stored in memory associated with the device.

26. The method of claim 23, wherein the device is a mobile phone.

27. The method of claim 23, wherein the device is incorporated into a power strip.

28. The method of claim 23, wherein the secure tunnel established by the device is encrypted via SSH.

29. The method of claim 23, further comprising covertly hiding the device onsite at the target network.

* * * * *